United States Patent [19]
Spijkerman et al.

[11] Patent Number: 5,514,263
[45] Date of Patent: May 7, 1996

[54] PROCESS FOR THE RECOVERY OF METALLIC LEAD FROM BATTERY PASTE

[75] Inventors: Johannus B. J. Spijkerman; Rudolf J. M. Groenen, both of Arnhem, Netherlands

[73] Assignee: H. J. Enthoven Limited, Derbyshire, England

[21] Appl. No.: 498,176

[22] Filed: Jul. 5, 1995

Related U.S. Application Data

[63] Continuation of Ser. No. 107,667, filed as PCT/EP92/00306, Feb. 10, 1992.

[30] Foreign Application Priority Data

Feb. 13, 1991 [GB] United Kingdom .................. 9102994

[51] Int. Cl.⁶ ..................................................... C25C 1/14
[52] U.S. Cl. ........................... 205/348; 205/597; 205/601
[58] Field of Search ..................................... 204/114, 119; 205/348, 597, 601

[56] References Cited

U.S. PATENT DOCUMENTS

| | | |
|---|---|---|
| 4,107,007 | 8/1978 | Gaumann et al. . |
| 4,229,271 | 10/1980 | Prengaman et al. . |
| 4,597,841 | 7/1986 | Kiessling et al. . |
| 4,824,541 | 4/1989 | Malpas et al. . |

FOREIGN PATENT DOCUMENTS 1428957  3/1976  United Kingdom .

OTHER PUBLICATIONS

D. P. Ziegler, et al. "A Preliminary Investigation of Some Anodes for Use in Fluidized Bed Electrodeposition of Metals", *Journal of Applied Electrochemistry* (11)(1981) pp. 625–637.

"Application of a High Surface Area Electrochemical Reactor System to the Pollution Control and Recovery of Metals from Process Effluent Streams in the Battery Manufacturing Industry" by Kalfa et al, *J. Electrochem. Soc., Reviews and News*, vol. 128 (1981) Aug., No. 8.

I. Dombovari, "Electrolyte for Electrochemical Regeneration of Lead Batttery" by I. Dombovari, *Chemical Abstracts*, vol. 97, No. 10, Sep. 1982, abstract number 75674.

*Primary Examiner*—John Niebling
*Assistant Examiner*—Brendan Mee
*Attorney, Agent, or Firm*—Theresa M. Gillis

[57] ABSTRACT

A process for the direct recovery of metallic lead from battery paste in an electrolysis unit is disclosed. The electrolysis unit consists of an anode compartment and a cathode compartment separated by an ion selective membrane. The cathode consists of a high surface area electrically conductive substrate. Solid particles of battery paste are introduced into the cathode compartment which contains a liquid electrolyte and a complexing agent. Metallic lead is electrochemically deposited on the cathode, and sulfuric acid is produced in the anode compartment.

20 Claims, 1 Drawing Sheet

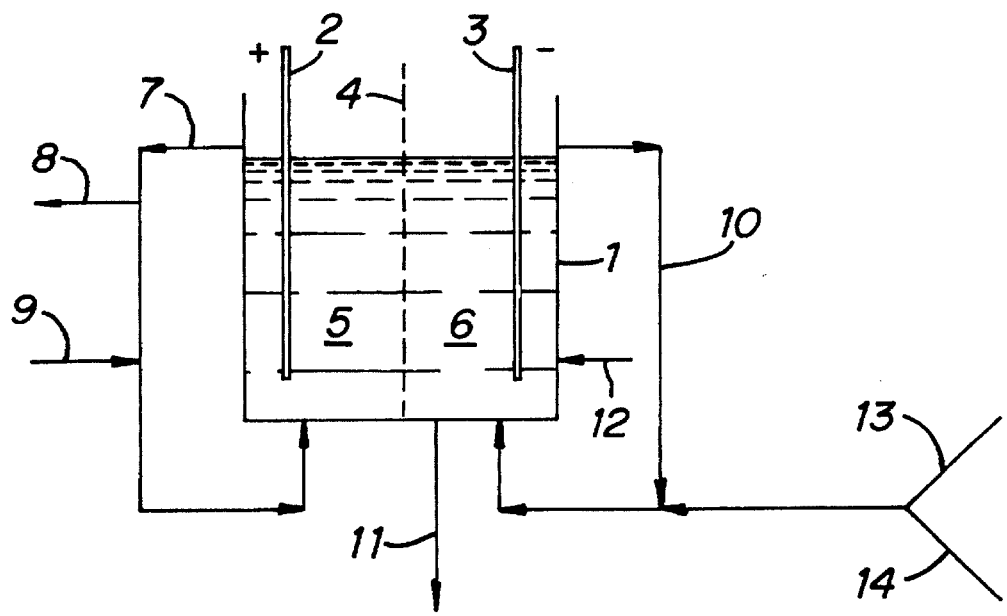
FIG_1
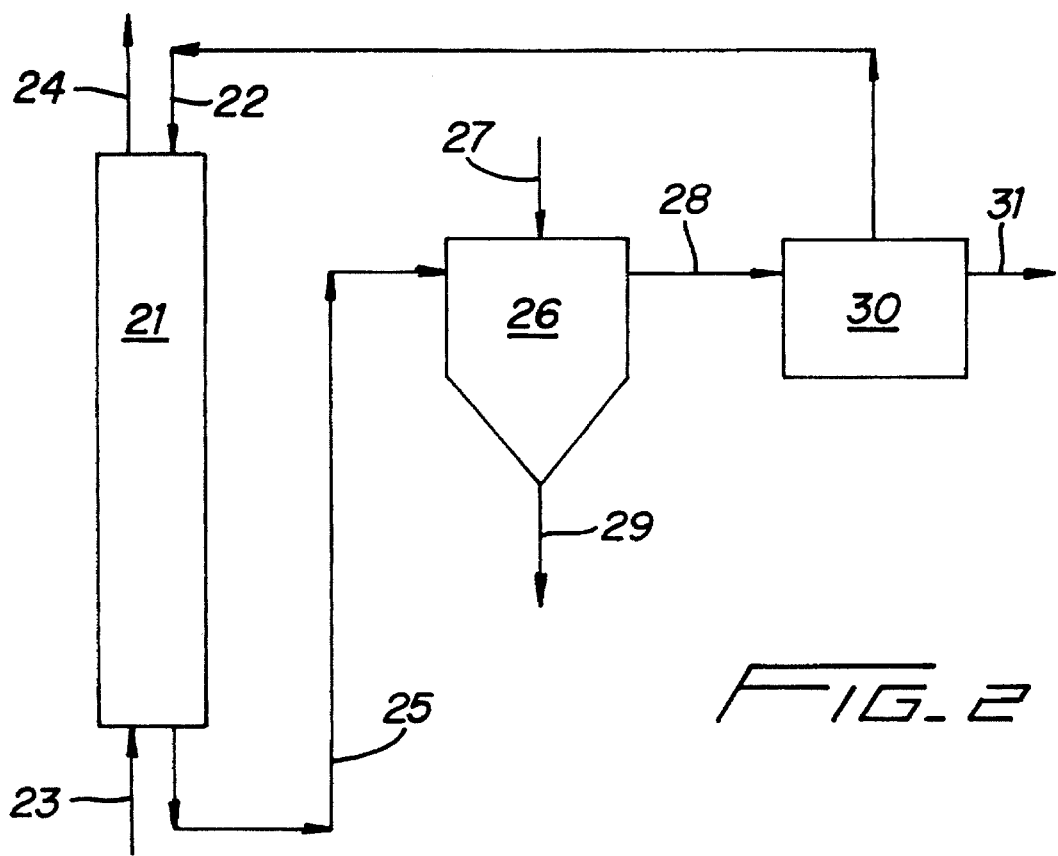
FIG_2

PROCESS FOR THE RECOVERY OF METALLIC LEAD FROM BATTERY PASTE

This is a continuation of application Ser. No. 08/107,667 filed Oct. 12, 1993, which claims the benefit of PCT application No. EP92/00306 filed Feb. 10, 1992.

BACKGROUND OF THE INVENTION

The present invention is directed to the recovery of metallic lead from battery paste. In the recovery of metals and more in particular lead from batteries various methods have been proposed. In view of the restrictions posed on the disposal of spent batteries, which restrictions are due to the presence of heavy metals therein, it is of importance to recover these metals, and more in particular lead therefrom.

Spent batteries can be comminuted, followed by separation of the lead containing components from the remainder of the battery, mainly plastics. The lead containing components are obtained in the form of a pasty product, battery paste. This battery paste consists mainly of salts and oxides of lead in particle form, together with an amount of water. The predominant components in the battery paste are lead(II)sulphate, lead(II)oxide and lead(IV)oxide.

Up to now recovery of lead from battery paste was usually done in a pyro-metallurgical process, by treatment of the paste with coke and iron-(III)-oxide at high temperature. In this process metallic lead was obtained, together with various iron salts, such as FeS. Unfortunately, in this process also some $SO_2$ could be produced. As the iron salts are chemical waste and the production of $SO_2$ is undesirable, alternatives for the pyro-metallurgical processes are required.

SUMMARY OF THE INVENTION

The invention aims at providing an alternative process for the recovery of metallic lead from battery paste, which process does not possess the disadvantages of the known pyro-metallurgical process.

The invention is based on the insight, that it is possible to process battery paste in an electrolysis unit having at least a high surface area cathode means under production of metallic lead in a pure form, without the problem inherent to the known process.

The invention is directed to a process for the recovery of metallic lead from battery paste, comprising introducing the battery paste into at least one electrolysis unit, said unit comprising, anode and cathode means as electrode means arranged therein, at least said cathode means being a high surface area electrode means, and a liquid electrolyte containing an effective amount of complexing agent, and electrochemically depositing metallic lead upon said cathode means.

The invention further provides a process in which the electrolysis unit consists of an anode and a cathode compartment which are separated from each other by means of a diaphragm or a selective membrane. High surface areas for the electrode means from 40 to 5000 $m^2/m^3$ are preferred.

Since high surface area electrodes, resulting in high current densities, are required for processing slurry streams like the battery paste efficiently, further embodiments of the invention comprise stretch-metal electrodes (see article by D. P. Ziegler et al., "A preliminary investigation of some anodes for use in fluidized bed electrodeposition of metals", "Journal of Applied Electrochemistry", V. 11 (1981), p. 625–637) and electrically conducting particles. In particular said particles form a pulsating bed. Furthermore, it will be clear to chose skilled in the art that electrically conducting particles comprise a wide variety, for example from copper and steel particles to even silicium carbide particles.

In a further embodiment of the invention the battery paste is introduced into said cathode compartment being separated from the anode compartment by means of an anion selective membrane. Preferably the high surface cathode means comprises electrically conducting particles, in particular lead particles, which form a fluidized bed.

Fluidized bed electrolysis is a known concept, for example disclosed in Chemistry and Industry, 1st July, 1978, pages 465–468. A fluidized bed electrolysis cell comprises an anode compartment and a cathode compartment which are separated from each other by a diaphragm or membrane (see article by A. Herrera, "Halides and sulphate ion diffusion in nafion membranes", Journal of Electrochemical Science and Technology, V. 134, 1987, No. 10, p. 2446–2450). The cell is filled with liquid electrolyte, such as an aqueous solution of sulphuric acid and sodium sulphate. The cathode compartment contains particles of a conductive metal, usually the metal to be obtained in the process. These particles are kept in fluidized state by an upflow of liquid. The electrical charge which makes the particles function as a cathode, results from particle contact with current feeders as well as from contact with other particles.

BRIEF DESCRIPTION OF THE DRAWINGS

FIG. 1 illustrates a flow scheme of the fluidized bed electrolysis system.

FIG. 2 illustrates a preferred embodiment.

DETAILED DESCRIPTION OF THE INVENTION

Surprisingly it has been found that it is possible to treat battery paste in a fluid bed electrolysis unit, within which an anion selective membrane is used, together with the presence of a complexing agent in the liquid electrolyte. This method could be called slurry electrolysis. In this manner the lead components in the battery paste can be converted to metallic lead. The mechanism of the conversion is not entirely clear, but indications are that the complexing agent solubilizes part of the lead(II)sulphate, which is electrochemically converted to metallic lead which is deposited on the fluidized metal particles. At the same time sulphate ions are obtained, which are transported to the anode compartment through the membrane.

The lead particles are continuously or intermittently removed from the cathode compartment as product and are replenished with finer particles.

The fluidization of the particles in the bed is obtained by a recirculation of the catholyte, containing dispersed therein the battery paste. Preferably fresh battery paste is continuously or intermittently added to the recirculating catholyte. The battery paste consists of a mixture of lead salt and oxides in divalent and tetravalent form. A suitable amount of solid lead(II)sulphate in the slurry lies between 0.5 and 20 m. %.

As the electrochemical recovery of lead proceeds through the divalent form of the lead, it is preferred to treat the battery paste prior to introduction in the cell to convert the tetravalent lead to divalent lead. Thus a previous reducing step for reducing substantially all tetravalent lead to its divalent form is preferred. In particular this is done by reducing the battery paste with $SO_2$ or $Na_2SO_3$.

This treatment can be done in any convenient manner, but it is preferred to take up the $SO_2$ in an alkaline solution, thereby forming a solution of $Na_2SO_3$. This is preferably done in a scrubber, wherein the $SO_2$ containing gas is scrubbed with the alkaline solution. The solution of sodium sulphite obtained thereby is used to treat the battery paste. The thus treated battery paste, wherein the major part of the lead will be in divalent form, can then be separated from the liquid and can be introduced into the recirculating catholyte.

Especially when the battery paste is processed at a site where waste $SO_2$ is present, this process has important advantages. Not only is it very easy to treat the battery paste in this way, but it also takes care of a waste gas stream. In case the amount of $SO_2$ that is produced fluctuates with time it may be possible to have a buffer vessel for the sodium sulphite solution.

Both the above said catholyte and alkaline solution can contain an effective amount of complexing agent. The amount thereof varies depending on the type of complexing agent. The amount should be such that sufficient divalent lead is available in dissolved form for electrolysis. Suitable amounts of dissolved lead are at least 0.3 g/l, preferably at least 1.0 g/l. The upper limit is not very important, but can for example be 15 g/l. A suitable range for the amount of complexing agent is from 5 mmol/l to 0.5 mol/l.

As complexing agent various agents can be used. An important factor is the pH at which it functions as complexing agent, in relation to the pH at which the membrane can function. Suitable agents are i.a. nitrilotriacetic acid, EDTA, acetic acid, oxalic acid, malonic acid, and mixtures of two or more of these complexing agents and salts thereof. A preferred agent is nitrilotriacetic acid (NTA), as this can be used with rather mild pH values, within a broad range.

In particular in the scrubbing of the $SO_2$ containing gas with an alkaline solution it has been found that the presence of the complexing agent in said solution has the advantage that the pH range within which one can work is much broader.

The use of said complexing agent in said scrubber system in combination with the use as complexing agent in the electrolysis has the combined advantage that no careful separation of the liquid from the battery paste is required.

The process can be carried out in one electrochemical cell, but it is also possible to use a combination of cells, each using a different size of lead particles. The specific choice depends mainly on the economy of the process. The process conditions like temperature, pH, flow of electrolyte, particle size of the electrically conducting particles, current density, type of membrane, type of anode/current feeder, etc. can be determined by one skilled in the art on the basis of the known criteria. For the applications as mentioned above temperatures between 20° and 90° C., pH-values between 1 and 11, current densities between 200 and 6000 $A/m^2$, and particle diameters between 0.6 and 3.5 mm are preferred.

The invention will now be elucidated on the basis of FIGS. 1 and 2, showing two flow schemes, wherein the main process and a preferred embodiment are given.

In FIG. 1 a flow scheme of the fluidized bed electrolysis system is given. The electrolysis cell 1 is provided with an anode 2 and a current feeder (cathode) 3.

The anode and cathode compartments (5 and 6) are separated from each other by an anion-selective membrane 4. The liquid in the anode compartment 5 is recirculated through line 7. Through line 8 diluted sulphuric acid is removed, whereas through line 9 fresh water is added to the system to compensate for the water removed from the anode compartment 5. The cathode compartment 6 contains lead particles that are kept in fluidized state by the recirculation of slurry through line 10. A part of the lead particles is removed as product through line 11. New particles can be added through line 12. To the recirculation line fresh battery paste can be added through line 13, whereas fresh complexing agent can be added through line 14.

In FIG. 2 a system for pretreatment of battery paste is described. This system consists of an $SO_2$ scrubber 21 to which a recirculated alkaline NTA containing solution is fed through line 22. $SO_2$-containing gas is introduced in the scrubber 21 through line 23 and the scrubbed gas is removed from the scrubber 21 through line 24. The sulphite-containing liquid is removed from the scrubber through line 25 and introduced in vessel 26 to which also battery paste is fed through line 27. In the vessel 26 the battery paste is treated whereby the major part of the lead is converted to divalent state. The slurry of treated battery paste is removed from the vessel through line 28, followed by a rough solid liquid separation in separator 30. The liquid is recirculated through line 22 to the scrubber 21, whereas the solids, still wet, can be introduced in the recirculation loop 10 of FIG. 1 from line 31. Any remaining solids in the vessel 26, such as metallic lead can be removed from the vessel 26 through line 29.

The invention is now elucidated on the basis of the following examples.

EXAMPLES

In a fluidized bed electrolysis unit battery paste was electrochemically converted to metallic lead. The battery paste was fed into the cathode loop from a separate stirred container as a slurry containing 200 g/l paste. The paste was previously converted to lead(II)sulphate in a conversion step using sodium sulphite as reductor, sulphuric acid in 0.5 molar sodium sulphate as electrolyte and 0.01M NTA as complexant.

The slurry is fed at a rate of 200 ml/h and the pH of the catholyte is controlled by the addition of 10M NaOH. The electrolysis unit consisted of one cathode compartment between two anode compartments. A lead/silver anode was used, whereas the current feeder in the cathode compartment consisted of a copper feeder plate.

In the experiments the catholyte composition was kept at 0.5 mol/l sodium sulphate and 0.005 mol/l NTA. The solids content of the solution varied between about 0.5 and 1.5 m/m %. The pH of the catholyte was kept at 4.0 at a temperature of 50° C. As anolyte a 2 m/m % sulphuric acid solution was used.

The cell voltage was 3.2 V at a current density of 750 $A/m^2$. This resulted in an energy consumption of 1.2 kWh/kg lead produced. The space time yield was 16 $kg/m^3.h$. During the experiments the high surface area of the fluidized lead particles changed from about 3500 to 2000 $m^2m^3$.

Using a comparable system as disclosed hereinabove various complexing agents were used. The temperature of the experiments was 45° C. and the slurry density was 27 mass %.

Results of the experiments are expressed in Pb-recovery-values, being percentages of the amount of lead introduced into the cell compared to the amount of lead recovered.

The following results are obtained.

| Complexing agent | Concentration mol/l | Pb-recovery % |
|---|---|---|
| NTA | 0.1 | 100 |
| EDTA | 0.1 | 86 |
| EDTA | 0.13 | 96 |
| Ethylene diamine | 0.17 | 70 |

We claim:

1. A process for recovering metallic lead from battery paste comprising
   (a) introducing battery paste slurry containing solid lead particles into the cathode compartment of an electrolysis unit, said electrolysis unit comprising:
      (i) an anode and a cathode compartment separated by an ion selective membrane or a diaphragm,
      (ii) said cathode compartment comprising a high surface area electrode of 40 to 5000 $m^2/m^3$,
      (iii) liquid electrolyte containing a complexing agent, and
      (iv) a bed of fluidized particles comprising said solid lead particles in said cathode compartment
   (b) electrochemically depositing the lead contained in the fluidized lead particles as metallic lead on the cathode, and
   (c) removing the deposited lead from the cathode.

2. The process of claim 1 wherein said cathode compartment and said anode compartment are separated by an ion selective membrane.

3. The process of claim 1 wherein said high surface area electrode means is comprised of stretch-metal.

4. The process of claim 1 wherein said high surface area electrode means is comprised of electrically conducting particles.

5. The process of claim 4 wherein said electrically conducting particles form a pulsating bed.

6. The process of claim 4 wherein said electrically conducting particles form a fluidized bed.

7. The process of claim 4 wherein said electrically conducting particles are comprised of lead.

8. The process of claim 1 wherein said ion selective membrane is an anion selective membrane and said battery paste is introduced into said cathode compartment.

9. The process of claim 1 wherein dissolved lead is present in said electrolyte, said dissolved lead being maintained at a concentration between about 0.3 and 15 grams/liter.

10. The process of claim 1 wherein said electrolyte is a solution of water and a member of the group consisting of sulphuric acid, salts of sulphuric acid and mixtures of sulphuric acid and salts of sulphuric acid.

11. The process of claim 10 wherein said electrolyte is comprised of a solution of sulphuric acid and sodium sulphate.

12. The process of claim 1 wherein battery paste is suspended in said electrolyte, further comprising the steps of continuously removing said electrolyte from said cathode compartment, adding battery paste to said electrolyte and recirculating said electrolyte to said cathode compartment.

13. The process of claim 12 further comprising the step of reducing substantially all lead in said battery paste from its tetravalent form to its divalent form before said lead is added to said electrolyte.

14. The process of claim 13 wherein said battery paste is treated with one or more of the members of the group consisting of $SO_2$ and $Na_2SO_3$ before being introduced into said cathode compartment.

15. The process of claim 13 in which said $SO_2$ is present in an alkaline solution having complexing agent therein.

16. The process of claim 15 further comprising the steps of
   separating said battery paste treated with said $SO_2$ from liquid present in said alkaline solution,
   recirculating said liquid to the battery paste treatment tetravalent lead reduction and
   adding $SO_2$ to said recirculated liquid.

17. The process of claim 15 wherein said complexing agent is a solution of one or more members of the group consisting of nitrilotriacetate, EDTA, acetic acid, oxalic acid, and malonic acid.

18. The process of claim 17 wherein said electrolyte contains between 5 mmol/l and 0.5 mmol/l of complexing agent based on the volume of electrolyte.

19. The process of claim 17 wherein said alkaline solution contains between 5 mmol/l and 0.5 mmol/l of complexing agent based on the volume of alkaline solution.

20. A process for recovering metallic lead from battery paste comprising:
   (a) treating battery paste with one or more of the members of the group consisting of $SO_2$ and $Na_2SO_3$ to reduce substantially all lead in said battery paste from its tetravalent form to its divalent form,
   (b) introducing said treated battery paste as a slurry containing solid lead particles into the cathode compartment of a fluidized bed electrolysis unit, said electrolysis unit comprising:
      (i) two anode compartments,
      (ii) a cathode compartment comprising a high surface area cathode of greater than 40 $m^2/m^3$ of cathode compartment volume,
      (iii) an anion selective membrane between said anode and cathode compartments,
      (iv) a liquid electrolyte containing complexing agents disposed within said electrolysis unit, and
      (v) said solid lead particles fluidized in said cathode compartment
   (c) electrochemically depositing metallic lead upon said cathode, and
   (d) removing metallic lead deposited on said cathode from said electrolysis unit.

* * * * *